United States Patent
Willer

(10) Patent No.: US 6,584,079 B1
(45) Date of Patent: Jun. 24, 2003

(54) APPARATUS AND METHOD OF IMPLEMENTING A HOME NETWORK BY FILTERING ISDN-BASED SIGNALS WITHIN THE CUSTOMER PREMISES

(75) Inventor: Bernd Willer, Moosburg (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/302,371

(22) Filed: Apr. 30, 1999

Related U.S. Application Data

(60) Provisional application No. 60/129,355, filed on Apr. 15, 1999.

(51) Int. Cl.$^7$ .................................................. H04B 3/20
(52) U.S. Cl. ..................... 370/284; 370/362; 370/365; 370/386; 370/400; 370/401; 370/402; 370/488; 370/489; 370/490
(58) Field of Search ................................ 370/419, 420, 370/421, 282, 286–290, 466, 463, 482, 493, 489, 490; 379/377, 398, 399, 413.02; 375/346, 350

(56) References Cited

U.S. PATENT DOCUMENTS

| | | | | |
|---|---|---|---|---|
| 4,592,047 A | * | 5/1986 | Fundneider | 370/58 |
| 5,305,312 A | * | 4/1994 | Fornek et al. | 370/62 |
| 5,781,728 A | * | 7/1998 | Rybicki et al. | 709/230 |
| 5,815,505 A | * | 9/1998 | Mills | 370/522 |
| 5,889,856 A | * | 3/1999 | O'Toole et al. | 379/399 |
| 5,982,785 A | * | 11/1999 | Woerner et al. | 370/488 |
| 6,088,368 A | * | 7/2000 | Rubinstain et al. | 370/480 |
| 6,128,335 A | * | 10/2000 | Liu et al. | 375/220 |
| 6,144,659 A | * | 11/2000 | Nye et al. | 370/359 |
| 6,144,734 A | * | 11/2000 | Beeman | 379/398 |
| 6,148,006 A | * | 11/2000 | Dyke et al. | 370/480 |
| 6,215,855 B1 | * | 4/2001 | Schneider | 379/22 |
| 6,246,695 B1 | * | 6/2001 | Seazholtz et al. | 370/468 |
| 6,272,219 B1 | * | 8/2001 | De Bruycker et al. | 379/399.01 |
| 6,295,343 B1 | * | 9/2001 | Hjartarson et al. | 379/93.05 |
| 6,298,046 B1 | * | 10/2001 | Thiele | 370/282 |
| 6,317,464 B1 | * | 11/2001 | Le et al. | 375/257 |
| 6,327,264 B1 | * | 12/2001 | Terry et al. | 370/445 |
| 6,370,150 B1 | * | 4/2002 | Hofer et al. | 370/419 |

FOREIGN PATENT DOCUMENTS

WO     WO 97 11534 A     3/1997

OTHER PUBLICATIONS

Jeff Tyson, "How Phone–Line Networking Works," Copyright 1998–2002, Howstuffworks, Inc.*

Chow et al., "A Multi–drop In–house ADSL Distribution Network", International Conference on Communications (ICC), US, New York, IEEE (1994).

The Home Phoneline Networking Alliance: "Simple, High–Speed Technology for the Home", White Paper, Online!(Jun., 1998).

* cited by examiner

*Primary Examiner*—Dang Ton
*Assistant Examiner*—Van Nguyen
(74) *Attorney, Agent, or Firm*—Manelli Denison & Selter PLLC; Leon R. Turkevich

(57) ABSTRACT

An arrangement for implementing a network in an ISDN-BASED customer premises having a 4-wire ISDN S0 bus. The ISDN-BASED customer premises includes a Network Termination Basic Access (NTBA) that interfaces between the residential customer premises and the public switched telephone network by mapping the 2-wire ISDN signal onto the 4-wire bus. A low pass filter is added to the 2-wire send path to eliminate high frequency noise caused by harmonic reflections of the ISDN-based signals on the 4-wire bus. The filter also provides a delay between the zero crossing of the ISDN-based signals and the transmitted network signals, minimizing the effect of the ISDN zero crossings on the home network signal.

15 Claims, 2 Drawing Sheets

APPARATUS AND METHOD OF IMPLEMENTING A HOME NETWORK BY FILTERING ISDN-BASED SIGNALS WITHIN THE CUSTOMER PREMISES

CROSS-REFERENCE TO RELATED APPLICATION

This application claims priority from Provisional Application No. 60/129,355, filed Apr. 15, 1999 entitled "Frequency-Sensitive Impedance Blocking and Coupling Arrangements for a Home Network System"

FIELD OF THE INVENTION

The present invention relates to network interfacing, and more particularly, to methods and systems for controlling transmission of data between network stations connected to a telephone line medium.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) Protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based as detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home: network environment, provides the advantage that existing telephone wiring in a home tray be used to implement a home network environment. However, telephone lines are inherently noisy due to spurious noise caused by electrical devices in the home for example dimmer switches, transformers of home appliances, etc. In addition, the twisted pair telephone litter suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely to the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

An additional problem encountered in European telephone systems involves the use of a network termination basic access (NTBA) device, used as an interface between the residential customer premises and a central office of the public switched telephone network for transmission of Integrated Services Digital Network (ISDN)-based signals. In particular, NTBA devices map a two-wire ISDN signal from a central office into a 4-wire S0 bus having a 2-wire send path and a 2-wire receive path for sending and receiving the ISDN-based signals throughout a customer premises. The ISDN-based signals generate harmonic reflections on the S0 bus that cause substantial interference with the higher-frequency network signals. Moreover, the zero crossing of as ISDN-based signal interferes substantially with the transmitted network signals rendering the transmitted network signal unusable due to the harsh conditions on the 4-wire S0 signal bus.

SUMMARY OF THE INVENTION

There is a need for an arrangement for interconnecting computer end stations in a home telephone network having a network termination basic access (NTBA) device and configured for sending ISDN-based signals on a 4-wire bus.

There is also a need for an arrangement for implementing a home computer network in ISND-bases customer premises configured for sending and receiving ISDN-based signals on a 4-wire S0 bus.

These and other needs are attained by the present invention, where a low pass filter is coupled to a 2-wire send path for attenuation of harmonics of ISDN-based signals that interface with transmitted network data signals. The low pass filter also delays the ISDN-based signals relative to the network data signals to minimize interference by the ISDN-based signal.

According to one aspect of the present invention, a method is provided of implementing a local area network is a hone telephone network having a network termination basic access (NTBA) device, configured for sending and receiving ISDN-based signals to and from a public switched telephonic network, and a four-wire bus including a two-wire send path and a two-wire receive path for sending and receiving the ISDN-based signals, respectively, between the NTBA device end taps along the four-wire bus. The method includes connecting a low pass filter, configured for passing the ISDN-based signals and rejecting harmonics thereof, between the two wires of the two-wire send path, and transmitting network data signals having frequencies substantially higher than the ISDN-based signals, between the taps.

According to another aspect of the present invention, a computer network includes a network termination basic access (NTBA) device, configured for sending and receiving ISDN-based signals to and from a public switched telephone network, a four-wire bus a two-wire send path and a two-wire receive path for sending and receiving the ISDN based signals between the NTBA device and ISDN customer premises equipment, first and second end stations configured for exchanging network data signals, having frequencies substantially higher than the ISDN-based signals, via at least one of the two-wire send path and the two-wire receive path, and a low pass filter. The low pass filter is coupled to the two-wise sand path for passing the ISDN-based signals and filtering harmonic signals of the ISDN-based signals substantially at the frequencies of the network data signals, the low pass filter enabling transmission of the network data signals via the at least one of the two-wire send path and the two-wire receive path.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
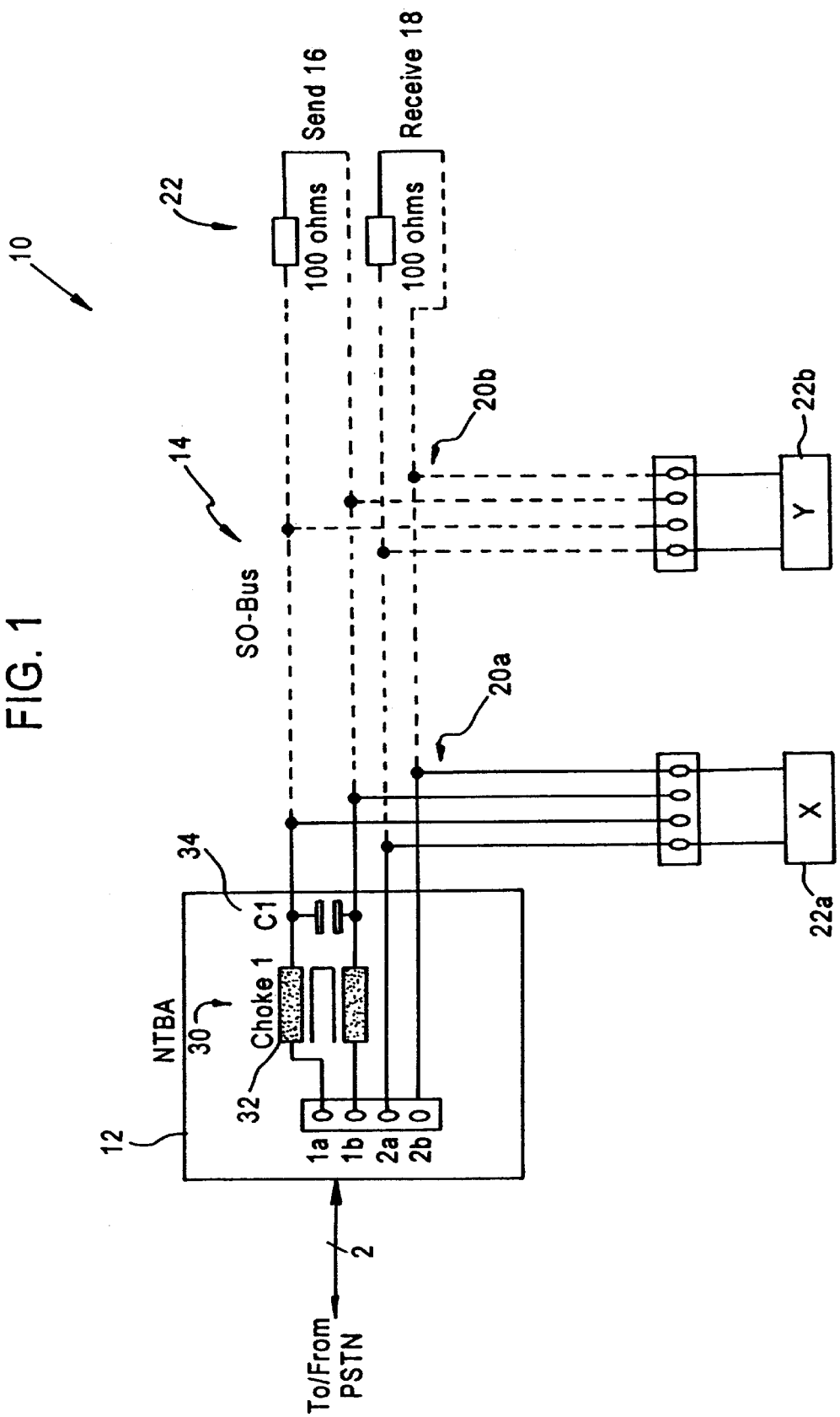
FIG. 1 is a block diagram illustrating a computer network implemented is a customer premises having ISDN-based wiring according to an embodiment of the present invention.

FIG. 1 is a diagram of an Ethernet (IEEE 802.3) local area network 10 implemented is a home environment using ISDN-based signals according to an embodiment of the present invention. As shown in FIG. 1, the home environment includes a network termination basic access (NTBA) device 12, configured for sending and receiving Integrated Services Digital Network (ISDN signals to and from a public switched telephone network via a two-wire twisted pair. At recognized is the art, the NTBA device 12 is configured for outputting a 4-wire S0 bus 14, having two wires for a send path 16 and two wires for a receive path 18. Typically implemented in European households, the S0 bus 14 may have multiple connections, of "taps" 20 connected is parallel off the S0 bus 14.

Conventional networking technologies assume a Category 5 twisted pair medium for transmission of network signals as differential signals. In the disclosed ISDN environment, however, the NTBA 12 maps the ISDN signals into a 2-wire send path 16, and a 2-wire receive path 18. As recognized in the art, the receive path 18 reflects the ISDN signal transmitted on the send path 16, with a 2-bit spacing relative to the ISDN clock frequency of about 200 kHz (e.g., 192 kHz). Hence, due to the high level of ISDN noise is the frequency used for home networking, referred to as home PNA by the home phone network alliance, transmissions of home PNA data on ISDN-S0 bus 14 is normally not possible.

According to the disclosed embodiment, a low pass filter 30 is installed in the send path 16 of the NTBA 12. The low pass filter 30 includes an inductor 32 and a capacitor 34 that attenuates the high frequency noise caused by the harmonics of the ISDN signal transmitted on the two-wire send path 16 at a frequency of about 200 kHz (e.g., 192 kHz). Hence, the send path 16 and receive path 18 are free of high frequency harmonics that may affect the home network signals transmitted between end stations 22a and 22b at a frequency of at least about 7.5 MHz. As shown in FIG. 1, stations 22a and 22b have two-wire connections on the receive path 18.

Figure 2:
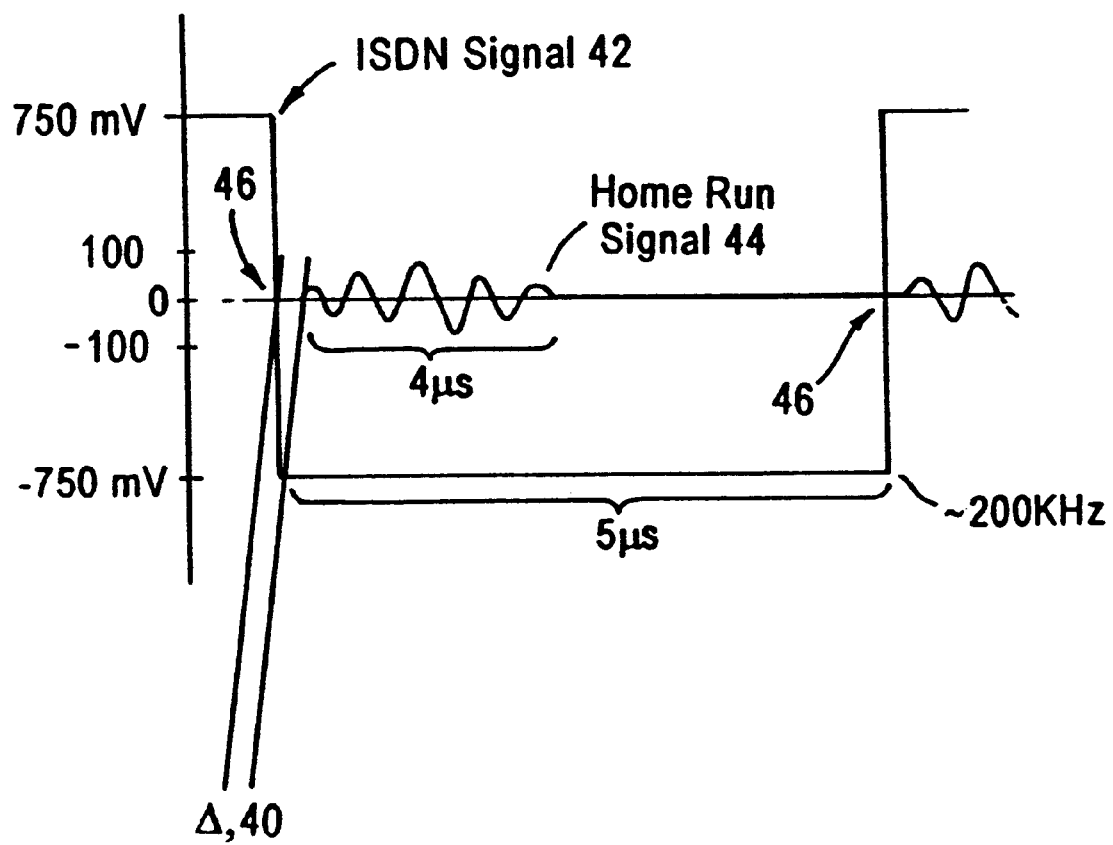
FIG. 2 is a diagram illustrating a delay performed by the low pass filter of FIG. 1 on the ISDN-based signals relative to the network data signals.

FIG. 2 is a diagram illustrating the delay introduced by the filter 30. As shown in FIG. 2, the filter 30 introduces a delay 40. This delay ensures that the zero crossings 46 of the ISDN signal 42 do not offset the network data signals 40 to the receive path 18.

While this invention has been described is connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of implementing a local area network in a home telephone network having a network termination basic access (NTBA) device, configured for sending and receiving ISDN-based signals to and from a public switched telephone network; and a four-wire bus including a two-wire send path and a two-wire receive path for sending and receiving the ISDN-baaed signals, respectively, between the NTBA device and taps along the four-wire bus, the method comprising:

connecting a law pass filter, configured for passing the ISDN-based signals and rejecting harmonies thereof, between the two wires of the two-wire send path; and transmitting network data signals, having frequencies substantially higher than the ISDN-based signals between the taps.

2. The method of claim 1, further comprising delaying the ISDN-based signals relative to the network data signals.

3. The method of claim 2, wherein the transmitting step includes transmitting the network data signals at a frequency of at least about 1.5 MHz.

4. The method of claim 3, further comprising transmitting the ISDN-based signals on the two-wire send path at a frequency of about 200 kHz.

5. The method of claim 2, wherein the phone-shifting step includes delaying a zero crossing of the ISDN-based signals from the network data signals by a time interval.

6. The method of claim 1, wherein the transmitting step includes transmitting the network data signals on the two-wire receive path.

7. A computer network comprising:

a network termination basic access (NTBA) device, configured for sending and receiving ISDN-based signals to and from a public switched telephone network;

a four-wire bus having a two-wire send path and a two-wire receive path for sending and receiving the ISDN-based signals between the NTBA device and ISDN customer premises equipment;

first and second end stations configured for exchanging network data signals having frequencies substantially higher than the ISDN-based signals, via at least one of the two-wire send path and the two-wire receive path; and a low pass filter, coupled to the two-wire send path, for passing the ISDN-based signals and filtering harmonic signals of the ISDN-based signals substantially at the frequencies of the network data signals, the low pass filter enabling transmission of the network data signals via the at least one of the two-wire send path and the two-wire receive path.

8. The computer network of claim 7, wherein the low pass filter delays the ISDN-based signals relative to the network data signals.

9. The computer network of claim 7, wherein the first and second and stations are coupled to the two-wire receive path and transmit said network data signals via the two-wire receive path.

10. The computer network of claim 7, wherein the NTBA device sends and receives the ISDN-based signals an the 4 wire S0 bus of at frequency of about 200 kHz.

11. The computer network of claim 10, wherein the end stations receive and transmit the network signals at a frequency of at least about 7.5 MHz.

12. The method of claim 1, wherein the transmitting step includes transmitting the network data signals as home PNA signals.

13. The computer network of claim 7, wherein the first and second end stations are configured for transmitting the network data signals as home PNA signals.

14. The method of claim 1, wherein the transmitting step includes transmitting the network data signals between first and second end stations coupled to the taps.

15. The computer network of claim 7, wherein the first and second end stations each are coupled to the corresponding at least one of the two-wire send path and the two-wire receive path.

* * * * *

UNITED STATES PATENT AND TRADEMARK OFFICE
CERTIFICATE OF CORRECTION

PATENT NO.    : 6,584,079 B1
DATED         : June 24, 2003
INVENTOR(S)   : Willer It is certified that error appears in the above-identified patent and that said Letters Patent is hereby corrected as shown below:

<u>Column 4,</u>
Line 18, delete "ISDN-baaed" and insert -- ISDN-based -- therefor;
Line 21, delete "law" and insert -- low -- therefor;
Line 22, delete "harmonies" and insert -- harmonics -- therefor.

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,584,079 B1
APPLICATION NO. : 09/302371
DATED : June 24, 2003
INVENTOR(S) : Willer It is certified that error appears in the above-identified patent and that said Letters Patent is hereby corrected as shown below:

Column 1, line 38, delete "as" and insert --on-- therefor;

Column 1, line 47, delete ":";

Column 1, line 48, delete "tray" and insert --may-- therefor;

Column 1, line 51, insert --,-- after "home";

Column 1, line 53, delete "litter" and insert --lines-- therefor;

Column 1, line 59, delete "to" and insert --on-- therefor;

Column 2, line 16, delete "as" and insert --an-- therefor;

Column 2, line 18, insert --,-- after "signals";

Column 2, line 29, delete "ISND-bases" and insert --ISDN-based-- therefor;

Column 2, line 40, delete second instance of "is" and insert --in-- therefor;

Column 2, line 41, delete "hone" and insert --home-- therefor;

Column 2, line 47, delete "end" and insert --and-- therefor;

Column 2, line 66, delete "two-wise sand" and insert --two-wire send-- therefor;

Column 3, line 29, delete "is" and insert --in-- therefor;

Column 3, line 34, insert --)-- after "ISDN";

Column 3, line 36, delete the first instance of "is" and insert --in-- therefor;

Column 3, line 40, delete "of" and insert --or-- therefor;

Column 3, line 50, delete "is" and insert --in-- therefor;

UNITED STATES PATENT AND TRADEMARK OFFICE
CERTIFICATE OF CORRECTION

PATENT NO. : 6,584,079 B1
APPLICATION NO. : 09/302371
DATED : June 24, 2003
INVENTOR(S) : Willer It is certified that error appears in the above-identified patent and that said Letters Patent is hereby corrected as shown below:

Column 4, line 16, delete ";" after "network" and insert --,-- therefor;

Column 4, line 31, delete "1.5" and insert --7.5-- therefor;

Column 4, line 35, delete "phone" and insert --phase-- therefor;

Column 4, line 65, delete "and" and insert --end-- therefor;

Column 4, line 69, delete "an" and insert --on-- therefor.

Signed and Sealed this

Twenty-seventh Day of October, 2009

David J. Kappos
*Director of the United States Patent and Trademark Office*